June 13, 1933.  W. J. PINE  1,914,160
POULTRY NEST
Filed March 23, 1931
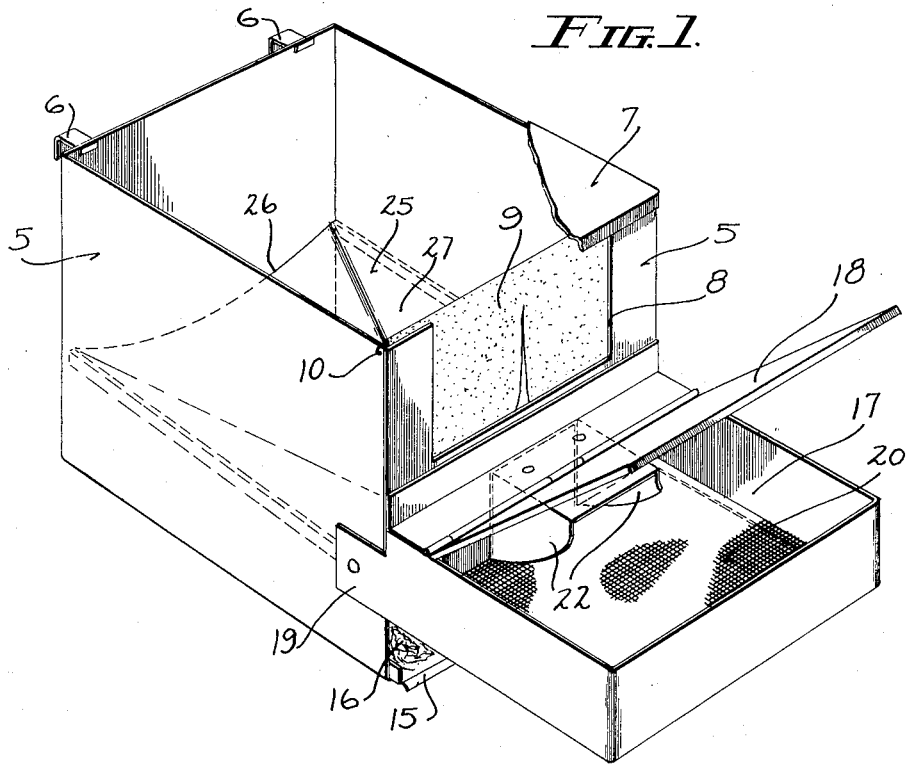
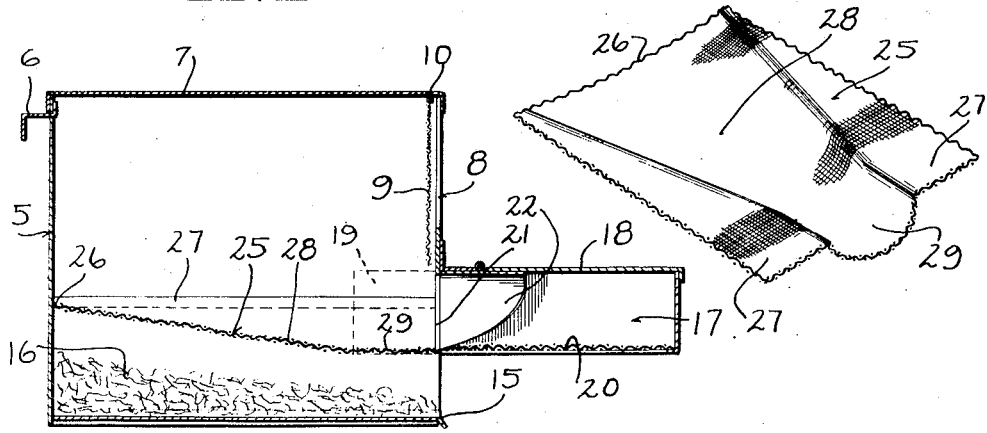
INVENTOR
Wilbur J. Pine
BY
Wheeler, Wheeler + Wheeler
ATTORNEYS Patented June 13, 1933

1,914,160

UNITED STATES PATENT OFFICE

WILBUR J. PINE, OF SAN FERNANDO, CALIFORNIA

POULTRY NEST

Application filed March 23, 1931. Serial No. 524,566.

This invention relates to improvements in poultry nests.

It is the object of the invention to provide an economical sanitary poultry nest in use of which egg breakage is substantially eliminated, the eggs are kept clean and merchantable, and the litter is spaced well below the nest proper and is readily accessible in order that it may be changed as required.

More specifically stated, it is my purpose to provide a nest in which there are no parts to be moved by the hen, but in the use of which the hen will invariably remove the newly laid egg from the nest by her own efforts and will thus protect it from breakage and dirt. I am aware of the fact that there have been numerous nests in the past in which the egg has rolled from the nest. I have found, however, that it is almost impossible to avoid occasional breakage in a nest of this character, either by contact of the egg with the sides or end of the delivery chute, or by contact of the egg with other eggs.

It is an important feature of the nest herein disclosed that the egg is not delivered by gravity from the nest, but is merely removed by gravity from a point immediately beneath the hen. Thereupon the hen will endeavor to manipulate the egg back to its original position, and in the attempt will cause it to pass from the nest into the collecting chamber. The egg arrives in the collecting chamber without any substantial momentum and does not strike other objects with a force sufficient to break.

Another specific purpose of the present invention is to prevent any direct contact between the litter and the wire mesh surface upon which the hen nests in laying the egg. I am aware of the fact that numerous wire mesh nests have been designed but, in general, it has been attempted to introduce litter immediately beneath the mesh, thereby rendering replacement of the litter difficult and furnishing a support for droppings and a refuge for parasites and disease-carrying germs and bacteria. I have found that it is entirely acceptable to the hens to have the straw or litter placed far below the wire mesh upon a tray or drawer which is readily removable beneath the egg collecting chamber, and the proposed arrangement is much more sanitary than any heretofore used.

In the drawing:

Figure 1 is a perspective view of an improved poultry nest embodying this invention, with the cover removed to expose its interior construction.

Figure 2 is a view in central section from front to rear of the nest.

Figure 3 is a detail view in perspective, of the wire mesh fabric upon which the hen nests.

Like parts are identified by the same reference character throughout the several views.

The metal case 5 is adapted to be assembled with other like cases to provide stacks or tiers of nests. It is provided with supports at 6 and a cover 7 which need only be used for the uppermost nest in the stack. The front wall of the case has a door opening at 8 screened by the usual split curtain 9 which is preferably removably carried on the hooked wire 10. The lower front portion of the case is open to receive the litter tray 15 bearing a suitable depth of straw or other litter at 16. The upper part of the opening is closed by an egg receiving chamber 17 having a hinged lid 18 and arms 19 which are riveted or otherwise secured to the nest casing 5. The bottom of the egg receiving compartment 17 is preferably lined with wire mesh at 20 in order to take advantage of the resilience thereof. The egg compartment communicates through a door at 21 with the nest casing, and guide walls are provided at 22 at each side of this opening, with outwardly curving lower margins to maintain a gradually diminishing control over the direction of the eggs as they enter the storage compartment 17 from the nest.

The nest proper comprises the panel of wire mesh 25 which is separately illustrated in Fig. 3. It will be noted that the rear margin 26 of this panel is only slightly concave. The side wing portions 27 thereof are substantially horizontal and gradually diminish in area from front to rear. The intermediate portion 28 upon which the hen nests, slopes from the rear of the nest toward the front and also becomes narrower between the horizontal wing portions 27, so that its concavity is continually increasing toward the front of the nest.

At the front portion of the nest the slope 28 merges with a delivery portion 29 of the wire mesh panel, the bottom of which is approximately horizontal from front to rear. The arrangement is such that an egg deposited anywhere upon the sloped portion 28 of the wire mesh panel 25 will come to rest on the delivery portion 29 of the panel until the efforts of the hen to pull the egg back beneath her will cause it to roll through the doorway 21 and between guide flanges 22 into the egg collecting chamber 17.

From the egg collecting chamber the eggs are removable without disturbing a hen who may be laying in the nest at the time of collection. The tray 15 provides means whereby the straw or litter 16 may also be changed without disturbing the hen in the nest.

Extensive tests of nests made in accordance with this invention have shown no egg breakage, very little soiling of eggs, and very satisfactory sanitary conditions. Soiling of the eggs is prevented not merely by the removal of the eggs from the path of dirt tracked into the nest by the next hen admitted thereto, but also by the fact that the droppings fall through the mesh of the nest into the straw or litter 16 which is spaced far therebeneath.

In the course of the tests referred to, the hens indicated a preference for this type of nest over other nests in common use.

I claim:

1. In a poultry nest, the combination with a case having an opening in its upper portion and an opening in its lower portion and an egg discharge opening at an intermediate level, of a wire mesh panel arranged to deliver eggs toward said egg discharge opening, an egg receiving compartment on the outside of said case in registry with said last mentioned opening to receive eggs passing therethrough, and a tray removably positioned within the case and provided with litter removable as a unit with said tray through the lower opening of said case.

2. In a poultry nest, a shaped panel of woven fabric having a concave portion sloping throughout one part of the panel and having its bottom substantially horizontal adjacent the panel margin, the horizontally bottomed concave portion of the panel being adapted to receive eggs by gravity from all other portions of the concave area of the panel, and to retain such eggs pending their dislodgement.

3. In a poultry nest, the combination with a nest case and an egg receiving chamber, said case and chamber being provided with a common communicating opening, of a nest floor having a horizontal portion adjacent said opening within the case and having other portions of its central area inclined toward said opening.

4. In a poultry nest, the combination with an apertured case and an egg receiving compartment registering with the aperture of the case, of a nesting floor within the case having a concave central area generally inclined toward said aperture and provided with an approximately level portion adjacent said aperture.

5. A poultry nest comprising a case having door, egg, and litter openings in its front wall, an egg chamber fastened to the intermediate portion of the exterior of the front wall of the case in registry with the egg opening therein, and a fabric mesh nest panel within the case having a central concave area generally inclined toward said egg opening.

6. A poultry nest comprising a case having door, egg, and litter openings in its front wall, an egg chamber fastened to the intermediate portion of the exterior of the front wall of the case in registry with the egg opening therein, and a fabric mesh nest panel within the case having a central concave area generally inclined toward said egg opening, the portion of said concave area immediately adjacent said opening having a substantially level bottom adapted to retain eggs delivered by gravity thereto from other portions of the panel pending the discharge of such eggs through said opening by the laying hen.

7. A poultry nest comprising a case having door, egg, and litter openings in its front wall, an egg chamber fastened to the intermediate portion of the exterior of the front wall of the case in registry with the egg opening therein, and a fabric mesh nest panel within the case having a central concave area generally inclined toward said egg opening, the portion of said concave area immediately adjacent said opening having a substantially level bottom adapted to retain eggs delivered by gravity thereto from other portions of the panel pending the discharge of such eggs through said opening by the laying hen, the lower portion of the case being supplied with litter spaced below said panel.

8. A poultry nest comprising a case having door, egg, and litter openings in its front wall, an egg chamber fastened to the intermediate portion of the exterior of the front wall of the case in registry with the egg opening therein, and a fabric mesh nest panel within the case having a central concave area generally inclined toward said egg opening, the portion of said concave area immediately adjacent said opening having a substantially level bottom adapted to retain eggs delivered by gravity thereto from other portions of the panel pending the discharge of such eggs through said opening by the laying hen, the lower portion of the case being supplied with litter spaced below said panel, and a tray carrying said litter and removable unitarily therewith beneath said chamber.

9. In a poultry nest, a nest panel comprising a formed wire screen having wing portions at its sides decreasing in width to the rear corners of the wings and connected by a central area increasing in concavity from the rear of the panel toward the front thereof, the extreme front portion of said central area having a substantially level bottom.

10. In a poultry nest, a nest case provided with an egg discharge opening, a nest bottom provided with a concave portion generally inclined toward said opening, an egg collecting chamber outside said case in registry with said opening, and a pair of guide flanges projecting from the sides of said case at each side of said opening into said egg chamber.

11. In a poultry nest, a nest case provided with an egg discharge opening, a nest bottom provided with a concave portion generally inclined toward said opening, an egg collecting chamber outside said case in registry with said opening, and a pair of guide flanges projecting from the sides of said case at each side of said opening into said egg chamber, said flanges having upwardly curving lower margins whereby gradually to decrease their control of the direction of movement of an egg entering said chamber.

WILBUR J. PINE.